May 25, 1954  H. T. SPARROW  2,679,365
ATTITUDE RESPONSIVE POWER CONTROL FOR COMBUSTION ENGINES
Original Filed April 3, 1946  3 Sheets-Sheet 2

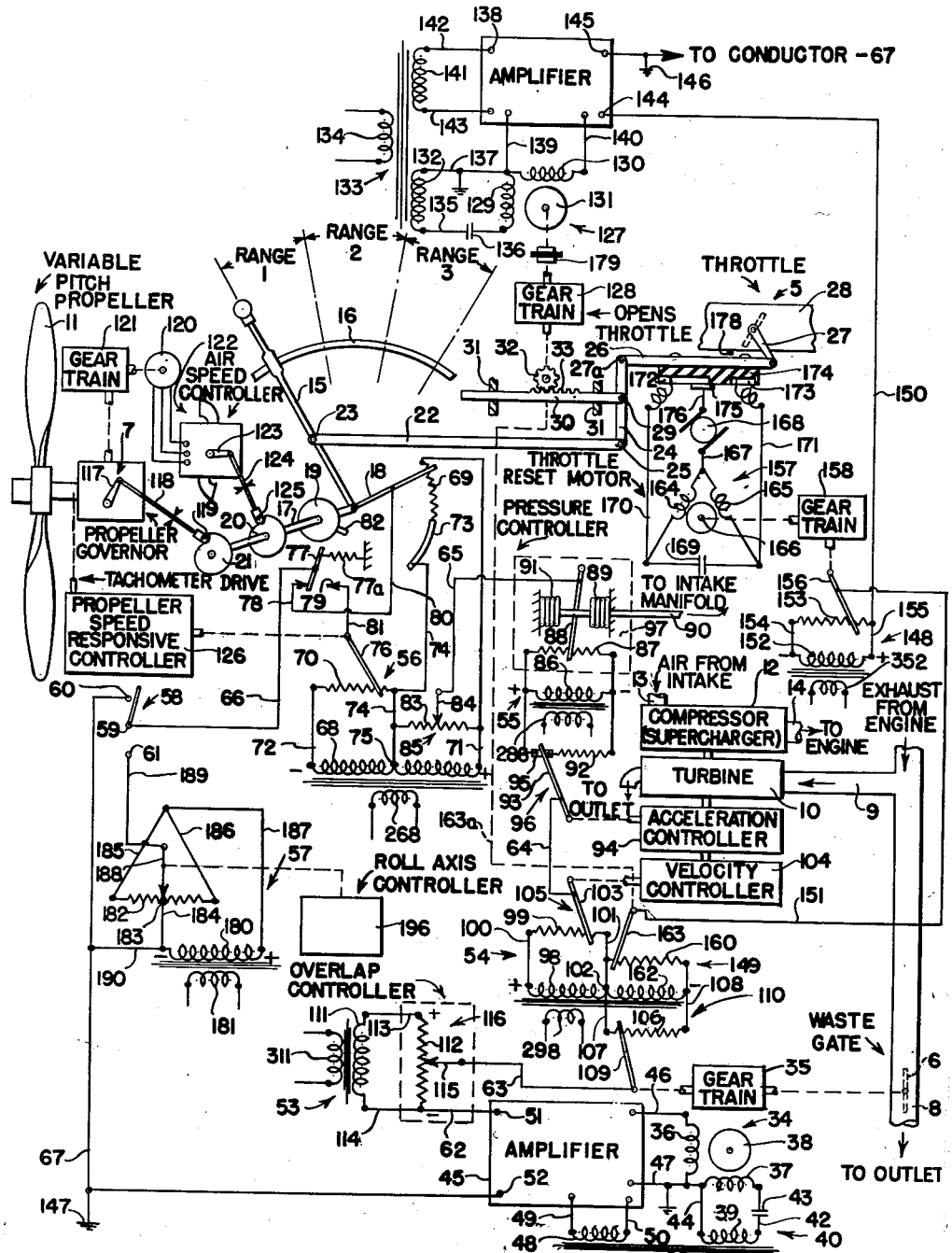
Fig. 1
INVENTOR.
HUBERT T. SPARROW
BY
ATTORNEY.

INVENTOR.
HUBERT T. SPARROW
BY
George H Fisher
ATTORNEY.

May 25, 1954      H. T. SPARROW      2,679,365
ATTITUDE RESPONSIVE POWER CONTROL FOR COMBUSTION ENGINES
Original Filed April 3, 1946      3 Sheets-Sheet 3

INVENTOR.
HUBERT T. SPARROW
BY George H. Fisher
ATTORNEY.

Patented May 25, 1954

2,679,365

UNITED STATES PATENT OFFICE 2,679,365

ATTITUDE RESPONSIVE POWER CONTROL FOR COMBUSTION ENGINES

Hubert T. Sparrow, Minneapolis, Minn., assignor to Minneapolis-Honeywell Regulator Company, Minneapolis, Minn., a corporation of Delaware Original application April 3, 1946, Serial No. 659,261. Divided and this application August 2, 1950, Serial No. 177,276

7 Claims. (Cl. 244—77)

This invention relates to improvements in power control apparatus for combustion engines, particularly to control apparatus for the engines used in aircraft. The present application is a divisional application of my Letters Patent No. 2,551,979 for "Coordinated Speed and Pressure Control Apparatus for a Combustion Engine," issued May 8, 1951.

The primary object of the invention is to provide for the pilot, or flight engineer, a single control member by which the speed and intake manifold pressure of a controlled combustion engine may be controlled in a certain and predetermined sequence and with the rate of change of both factors in accordance with the known optimum operating characteristics of the individual engine.

Aircraft engines are conventionally provided with turbine driven supercharging compressors, or turbo-superchargers as they are known, to provide a controllable supply of air under pressure for admixture with the fuel and admission to the intake manifold of the engine. To meet the changing conditions of atmospheric pressures encountered at different flight levels the rate of compression of the air is controlled by adjustment of a waste gate regulating the differential pressure of exhaust gases from the engine across the turbine, said gases being employed for operating the turbine in accordance with conventional practice. To regulate the effective intake manifold pressures the aforesaid waste gate is positioned as required while in addition the usual throttle is employed as a further control, the latter particularly where the boost afforded by supercharging is not required. The engine speed is determined by the setting of a variable pitch propeller controlled by a propeller governor.

Thus it is evident that the effective power output of the engine, being a result both of engine speed and the intake manifold pressure which determines the volume of the combustible mixture fed to the engine, is regulated by no less than three separate controls, namely, the throttle, waste gate and propeller speed governor. It is further to be understood that, for each type of engine, there is a known relative value of engine speed and intake manifold pressure under all conditions which, if maintained, will result in optimum power output and maximum efficiency from the propeller.

Having in mind these facts, it is a further and important object of my present invention to provide a single lever or single member control for an aircraft engine by which engine speed and intake manifold pressures may be conveniently controlled and selected in accordance with the known varying relative values of each, to secure at all times the optimum efficiency from both engine and propeller, and this without requiring that the pilot calculate and adjust the various controlling factors independently.

A further object is to provide a control system of this nature wherein the throttle remains under control of the manual selector member at all times so that the pilot may close the throttle and override the control system as a whole in an emergency. An auxiliary object in this connection is to provide a throttle control mechanism wherein is embodied a floating member positioned in accordance with the manually selected position of the single control lever, permitting the throttle to be opened as the engine is first set in operation, but providing flexibility such that the control lever may be further moved in a throttle opening direction for controlling engine speed and waste gate position, while retaining mechanical connection with the throttle.

Still a further object is to provide a combustion engine power control which is effective to vary the power output of the engine whenever the attitude of the engine is varied.

Still another object is to provide a control apparatus for a combustion engine having a regulating means for adjusting the flow of one of the components of an ignitable mixture flowing into the engine which will vary the rate of flow whenever an attitude responsive device indicates a deviation of the engine from a predetermined attitude.

Other objects and advantages of my invention will become apparent from a consideration of the appended specification, claims, and drawings, in which:

Figure 1 illustrates diagrammatically a complete engine control system embodying my invention;

Figure 4:
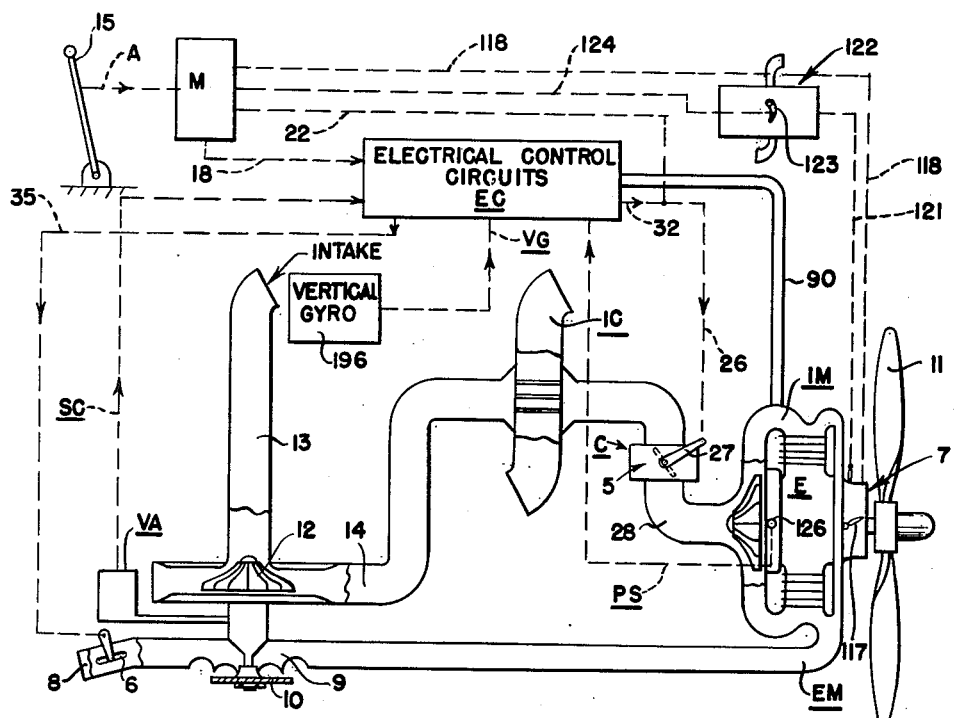
Figure 4 shows the subject control apparatus as it is associated with the engine whose power output is being controlled, the main components of Figure 1 being shown in block diagram form in this Figure 4.

Referring now more particularly to the Figures 1 and 4, I show therein a complete control system for positioning and controlling a throttle 5, a waste gate 6, and a propeller governor 7, all of conventional form. The throttle 5 as usual controls the flow of air to and through a carburetor C to the engine E and regulates the volume or weight of the combustible mixture supplied to the engine. The waste gate 6 controls the flow of exhaust gases flowing from the engine exhaust manifold EM to an outlet 8 and as the gate is progressively closed an increasing volume of the gases is directed through a duct or nozzle 9 to a turbine 10 to increase the speed thereof as will be evident. The governor 7 regulates the pitch of a variable pitch propeller 11 which is driven by the engine for the usual purposes, the governor acting to maintain the propeller speed for which it is set.

The turbine 10 operates a compressor or supercharger 12 which receives air at atmospheric pressure through an intake 13 and delivers the air under pressure through an outlet conduit 14 and intercooler IC to the engine, under further control of the throttle 5. The compression ratio of the compressor 12 is determined by its speed and hence the waste gate 6 affords very precise control of the pressure of the air delivered by the compressor.

For controlling and positioning the throttle 5, waste gate 6, and propeller governor 7, and accordingly controlling the engine speed and power, I provide an electro-mechanical system, shown in detail in Figure 1, embodying as a primary controller a single lever or member 15 adapted, as here shown, to be moved over an arcuate member 16 by hand from the indicated low power or initial position through three ranges designated in the drawing as ranges 1, 2, 3, toward a maximum power position. Referring to Figure 4, the lever 15 is shown operatively connected to the mechanical camming apparatus M which in turn is co-ordinating the adjustment of the propeller governor 7 through appropriate connecting means 118, an air speed controller 122 through connecting means 124 and adjusting lever 123, the throttle 5 through connecting means 22, 26 and 27 and the electrical control circuits EC through connecting means 18. All of the connecting means have been shown in dotted lines and the direction of the arrows on the dotted lines indicate the direction the control travels over the connecting means. Also adjusting the control circuits EC are control signals originating from a device VA responsive to the speed and acceleration of the turbine 10 connected to the control circuits EC by connecting means SC, a vertical gyroscope 196 connected to the control circuits by connecting means VG, and a propeller speed sensing device 126 connected to the control circuits by connecting means PS. A further control signal for the circuits EC is derived from the pressure on the intake manifold IM of the engine E through a pressure sensing duct 90. The output control from the electric control circuits EC serves to position the waste gate 6 through connecting means 35 and the throttle 5 through connecting means 32, 26, and 27. Reference should be made to Figure 1 and the discussion that follows to understand the details of construction and functioning of the control apparatus. Referring again to Figure 1, movements of the control lever 15 obviously will oscillate a shaft 17 whereon it is supported, thus moving a pressure selector wiper 18, a disc 19, and a cam 20 and a cam 21 all of which are attached to said shaft.

In addition, the control lever 15 positions the throttle 5 through a linkage mechanism comprising a first link 22 pivoted at one end at lever 23 to the lever, a second swinging link or lever 24 pivoted at one end at 25 to the other end of link 22, and a third link 26 pivoted at 27a to the other end of link 24, the remaining end of the third link 26 being pivotally attached to the usual crank 27 for swinging the throttle 5 in its induction system conduit 28. The swinging link 24 is, furthermore, fulcrummed at 29 upon one end of a floating bar or supporting link member which is axially shiftable in supports 31 by means of a pinion 32 engaging rack teeth 33 on the bar. The exact nature and purpose of this shiftable or floating support will be presently made clear.

The waste gate 6 is driven by a motor 34 through a gear train 35. The motor 34 is of the split phase type, being provided with a pair of field windings 36 and 37 which are spaced 90 electrical degrees apart, and an armature 38. The field winding 37 is supplied with electrical energy from a secondary winding 39 of a transformer 40 having a primary winding 41 which is connected to a suitable source (not shown) of alternating current. The energizing circuit for the winding 37 may be traced from the right hand terminal of the transformer winding 39 through a conductor 42, a condenser 43, the field winding 37, and a conductor 44 to the left hand terminal of the secondary winding 39.

The flow of electrical energy to the motor field winding 36 is controlled by an electronic amplifier 45 to which the winding is connected by conductors 46 and 47. The amplifier 45 is powered from another secondary winding 48 on the transformer 40, to which the amplifier is connected through conductors 49 and 50.

The amplifier 45 is provided with a pair of input terminals 51 and 52 and operates to supply the field winding 36 of the motor with alternating current the phase of which depends upon the phase of an alternating current signal impressed across these input terminals 51 and 52. Any common form of amplifier in which the phase of the output voltage reverses with a reversal of the phase of the input voltage may be used. A suitable amplifier of this type is shown in Figure 1 of the copending application of Albert P. Upton, Serial No. 437,561, filed April 3, 1942, now Patent No. 2,423,534, issued July 8, 1947.

It will be evident that if the motor field winding 36 is supplied with alternating current which leads the current in the other field winding 37 by ninety electrical degrees, the motor will rotate in one direction, whereas if the current in winding 36 lags the current in winding 37 by this amount, the motor will rotate in the opposite direction.

The phase of the signal applied to the amplifier input terminals 51 and 52 is determined by the electrical conditions existing in a compound network which consists of five networks connected in series. Of these five networks, designated generally at 53, 54, 55, 56 and 57, the latter may be connected in, or eliminated from the series circuit by means of a single pole, double throw switch 58 having a center blade terminal 59 and spaced blade terminals 60 and 61. For convenience this switch will be considered first as so positioned that the network 57 is cut out of circuit, the circuit being completed through the switch blade between the terminals 59 and 60 as seen in Figure 1. Bearing this in mind, the circuit may be traced from the amplifier input terminal 51 through a conductor 62, the network 53, a conductor 63, the network 54, a conductor 64, the network 55, a conductor 65, the network 56, a conductor 66, the switch 58, and a conductor 67 back to the other amplifier input terminal 52.

The network 56 includes a transformer secondary winding 68 across whose terminals are connected two series potentiometer or slidewire resistances 69 and 70 by means of conductors 71 and 72. The transformer carrying secondary winding 68 is shown as having a primary winding 268. The resistance 69, connected at one end by conductor 71 to the right hand terminal of winding 68, has also a conductive portion 73 which is connected by a conductor 74 to one end of the resistance 70, the other end of which is connected by aforesaid conductor 72 to the left hand terminal of winding 68. Said conductor 74 is also connected to a center tap 75 on winding 68. Cooperating with the resistance 69 and its conductive portion 73 is the wiper 18 operated by the control lever 15 and the advance movement of said lever is seen to cause this wiper 18 to traverse first the resistance 69 and then the conductive portion 73. The wiper thus varies in potential, with respect to winding 68, while traveling the resistance 69 but maintains a fixed potential, dependent upon the magnitude of the whole of this resistance 69, while traversing the length of the conductive portion 73. In practice the slider 18 traverses the whole length of the resistance 69 while the control lever 15 moves through range 1, previously referred to, and travels along conductive portion 73 while the lever moves through ranges 2 and 3.

Cooperating with the resistance 70 is a wiper 76 which is positioned by a propeller speed responsive controller 126 as will be discussed later. This wiper 76 is connected in circuit during the third or final range of advance movement of the control lever 15 by means of a snap acting changeover switch shown schematically as comprising a swinging blade 77 to which conductor 66 is connected, and a pair of opposed contacts 78 and 79. Contact 78, into engagement with which the blade 77 normally is urged by a biasing spring 77a, is connected by a conductor 80 to the wiper 18 and thus the circuit is normally completed to the network 56 through this wiper. Contact 79, on the other hand, is connected through a conductor 81 to the wiper 76 and the changeover switch is so located with respect to the disk 19 on the control lever shaft 17 that a finger 82 thereon will engage the switch blade 77 and oscillate it into engagement with contact 79 immediately as the control lever 15 enters its third or final range 3 of advance movement. Either the switch blade 79 is made resilient or some strain release means is provided to permit continued movement of lever 15 through range 3 after engagement of blade 77 with contact 79. Thus, during this range the slider 76 will control the potential produced by network 56 independently of control lever adjustment. As the lever is pulled back, the changeover switch will resume its normal position here shown by reason of the biasing action of spring 77a and manual control will be resumed by the slider 18.

Another slidewire resistance 83 is connected across one half of the winding 68 by a connection at its ends between the conductors 71 and 74, leading respectively to the right hand terminal and center tap of this winding. A slider 84 cooperates with this resistance 83 and together therewith forms a calibrating potentiometer 85. The connection between the center tap 75 of the winding 68 and the junction of the primary and secondary pressure selector controller potentiometer formed, respectively, by the slider 18 and resistance 69 and by the slider 76 and resistance 70, reduces the impedance between these sliders and slider 84 but does not otherwise affect operation of the network.

The network 55 comprises a transformer secondary winding 86 across the terminals of which is connected a slidewire resistance 87 as clearly shown. This transformer also has a primary winding 286. Cooperating with resistance 87 is a slider 88 and together these elements comprise a pressure controller potentiometer 97 which is adjusted in accordance with the pressure of the air delivered to the engine. For this purpose a bellows 89 is connected by a pressure line 90 to some point in the induction system between the compressor 12 and the engine, preferably the intake manifold of the engine (as indicated by a legend in the drawing), so that this bellows senses intake manifold pressure. An evacuated bellows 91 is provided and the two bellows are supported with their free ends at opposite sides of, and connected to, the slider 88 so that the same is positioned along resistance 87 by pressure changes. The bellows 91 compensates this controller for atmospheric changes in a well known manner. The conductor 65 connects sliders 84 and 88.

A second slidewire resistance 92 is connected as shown across the transformer secondary winding 86 and cooperating with this resistance is a slider 93 which is positioned by an acceleration responsive controller 94 connected to the turbine 10. Normally said slider 93 rests upon a conductive spot 95 on resistance 92, so that minor accelerations will have no effect on the system, but the controller 94 operates to swing slider 93 across the resistance in response to over-acceleration of the turbine. Said resistance 92 and slider 93 thus cooperate to form an acceleration limiting or compensating controller potentiometer 96.

The network 54 comprises a secondary winding 98 on a transformer, having a primary winding 298, and a slidewire resistance 99 is connected by a conductor 100 to one terminal of winding 98 and by a conductor 101 to a tap 102 on the winding. A slider 103 cooperates with the resistance 99 and is positioned therealong by connection to a velocity responsive controller 104 which is driven by the turbine 10. The resistance 99 and a slider 103 together form a velocity limiting or compensating controller potentiometer 105 which is adjusted in accordance with turbine velocity, the controller 104 operating to move the slider across the resistance when the velocity exceeds a safe maximum value. The conductor 64 connects the sliders 93 and 103.

The network 54 also includes a slidewire resistance 106, the left hand terminal of which is connected by a conductor 107 to the tap 102 on winding 98 and the right hand terminal of which is connected by a conductor 108 to the corresponding end terminal of the winding 98. Cooperating with the resistance 106 is a slider 109 and together these elements form a waste gate follow-up potentiometer 110. The slider 109 is moved along resistance 106 by connection to the aforesaid gear train 35 and the slider movement is thus concurrent with and proportional to that of the waste gate 6.

The network 53 comprises a secondary winding 111 on a transformer having a primary winding 311 and across the terminals of winding 111 is connected a slidewire resistance 112 by means of conductors 113 and 114. Cooperating with the resistance 112 is a manually movable slider 115 and together therewith the slider forms an overlap controller potentiometer 116, the purpose of which will later appear. The conductor 63 connects the sliders 109 and 115, while conductor 62 leading to amplifier input terminal 51 is connected to one end of the secondary winding 111.

The propeller governor 7 is adjusted directly by control lever 15 during the first range of advance movement thereof. For this purpose there is shown, for example, a crank 117 on the governor 7 to which is connected a link 118 operated by a follower 119 riding the cam 21. Said cam is so shaped that, during such first movement of the lever 15 and its shaft 17, the resulting oscillation of the cam will actuate the link 118 and swing crank 117 whereas continued movement of the cam will have no controlling effect upon the governor. For the remaining two ranges of movement of the control lever 15, the propeller governor 7 is adjusted by a reversible electric motor 120 through a gear train 121. Said motor is in turn controlled by an air speed controller 122 which, for example, is shown as regulated by a crank 123 to which is connected a link 124 having a follower 125 engaging cam 20. This cam 20 is then so formed that the initial movement of the cam, while control lever 15 moves through its first range, will have no effect on the air speed controller, while continued movement of the control lever through second and third ranges will adjust the air speed controller to select increasing air speeds. Such adjustment of controller 122 will then control motor 120 to adjust the propeller governor 7 and control the pitch of the propeller 11 as required. The propeller governor 7 may be of any conventional form.

Figure 5:
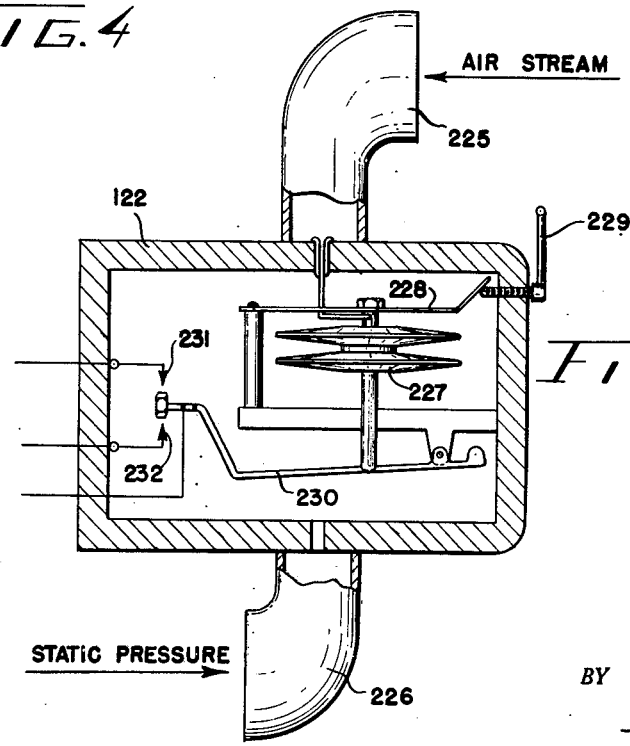
Figure 5 shows one possible way in which the airspeed control of the subject apparatus may be constructed.

The air speed controller may be of any conventional form such as is shown in Figure 5. The apparatus shown in Figure 5 is basically the same as that in the patent to Reichel, No. 2,363,143, issued November 21, 1944, with electrical contacts associated with the air speed indicating arm and with the adjusting screw acting as the airspeed selector. Referring to Figure 5, an air intake scoop is indicated at 225. This is exposed to the airstream along the forward line of flight of the craft. A conduit 226 is provided to supply a static air pressure to the subject controller. Located within the housing 122 is a bellows 227 which has the dynamic pressure from the air scoop 225 applied to the inside thereof and has the static pressure conduit 226 applied to the outside thereof. The bellows is resiliently supported by an adjustable blade 228, which is adjustable by adjusting means 229. The output arm of the bellows positions a floating lever 230 between a pair of contacts 231 and 232 associated with a three wire electrical control circuit. Movement of the adjusting mechanism toward the left has the effect of increasing airspeed selected while movement toward the right has the effect of decreasing the airspeed selected. While an air scoop has been shown in Figure 5, the conventional pitot tubes, as shown in the Reichel patent, may be substituted therefor.

It may here be noted, referring to Figure 1, that the first, second and third ranges of movement of control lever 15 are used merely for convenience in description and disclosure. Actually, of course, there will be no well defined or limited ranges of movement of the lever.

There is also provided a controller responsive to the engine or propeller speed, designated at 126, and which is driven, for example, by a tachometer connection to the propeller shaft. This controller, be it fly-ball governor type or otherwise, is arranged to position the slider 76 along the resistance 70 as the engine speed increases above a predetermined minimum. Inasmuch as the slider 76 and resistance 70 are cut into circuit only during the later advance movement of the control lever 15, the engine speed at which the controller 126 becomes effective to shift the slider will necessarily be fairly high, and one corresponding to a desirable engine speed for the intake manifold pressure selected by the preliminary movements of the lever.

The pinion 32 hereinbefore described, for axially adjusting floating member 30 is actuated by a reversible electric motor 127 through a gear train 128. This motor 127 is of the split phase type, like motor 34, and has a pair of field windings 129 and 130 spaced ninety electrical degrees apart, and an armature 131. The field winding 129 is supplied with electrical energy from a secondary winding 132 of a transformer 133 having a primary 134. The energizing circuit for this field winding 129 may be traced from a lower terminal of secondary winding 132 through a conductor 135, a condenser 136, the winding 129 and a conductor 137 to the upper terminal of winding 132.

The flow of electrical energy to the other field winding 130 is controlled by an electronic amplifier 138 to which said winding is connected by conductors 139 and 140. This amplifier is powered by another secondary winding 141 of transformer 133 to which winding the amplifier is connected by conductors 142 and 143. The amplifier 138 is provided with a pair of input terminals 144 and 145 and operates to supply motor field winding 130 with alternating current the phase of which is determined by the phase of a signal potential applied across the terminals 144 and 145. The amplifier 138 thus operates to control the motor 127 exactly as the previously described amplifier 45 controls the waste gate motor 34 and no further description should be required at this point.

The input terminal 145 of the amplifier 138 is connected to the input terminal 52 of the amplifier 45 and for convenience in illustration such connection is shown as made by ground connections indicated at 146 and 147.

The signal potential applied to the amplifier 138 is determined in part by the compound series network previously described but in addition by a separate network 148 and a controller 149 forming part of the network 54. The energizing or signal input circuit for amplifier 138 may be traced from the terminal 144 through a conductor 150, the network 148, a conductor 151, the controller 149 and network 54, the conductor 64, network 55, conductor 65, network 56, conductor 66, switch 58, conductor 67 and grounds 147 and 146 back to the other input terminal 145.

The network 148 comprises a transformer secondary winding 152 across the terminals of which is connected a slide-wire resistance 153 by means of conductors 154 and 155. The transformer carrying winding 152 has also a primary winding 352. Cooperating with the resistance 153 is a slider 156 positioned by a reversible, throttle reset motor 157 through a gear train 158. The resistance 153 and slider 156 together form a throttle reset controller controlling amplifier 138.

The controller 149 comprises a slidewire resistance 160 connected in parallel with the follow-up resistance 106 by conductors 161 and 162 and cooperating with said resistance is a slider 163. The slider 163 is operatively connected through a connection 163a to the gear 32 so as to assume a position corresponding to that of throttle motor 127. The resistance 160 and slider 163 together form a rebalancing potentiometer or controller.

The motor 157 is of the split phase reversible induction type having a pair of field windings 164 and 165 spaced ninety electrical degrees apart, and an armature 166. The field windings 164 and 165 have a common terminal 167 connected to one terminal of an inverter 168, or other suitable source of alternating current electrical energy, and between the other terminals of the windings is connected a condenser 169. Said other terminals of the field windings 164 and 165 are further connected by flexible conductors 170 and 171, respectively, to slider or chaser contacts 172 and 173. These contacts 172 and 173 are carried in spaced relation upon an insulating base 174 affixed to the link 26 of the throttle adjusting linkage and are adapted upon opposite movements of said link to make selective contact with a fixed center contact 175, to which the other terminal of the inverter 168 is connected by a conductor 176.

It will be evident that when the link 26 is moved to the right, in Figure 1, far enough to bring chaser contact 172 into engagement with center contact 175 a circuit will be closed to motor field winding 164 which may be traced from the upper terminal of the inverter 168 through the conductor 176, contacts 175 and 172, conductor 170, through winding 164 and through conductor 167 to the lower terminal of the inverter. This field winding 164 is thus energized directly by the inverter 168 and the voltage at the winding is of course in phase with that at the inverter. At the same time, the other motor field winding 165 is energized and the circuit may be traced from the upper terminal of the inverter 168 through the conductor 176, the contacts 175 and 172, the conductor 170, the condenser 169, the field winding 165, terminal 167 and back to the lower terminal of the inverter. The condenser 169 is thus in circuit with this winding 165 and the electrical effect thereof is to cause the voltage in this winding to lead that of the inverter, and the other field winding 164, by one quarter cycle or ninety electrical degrees. As a result, the motor armature 166 will rotate in one direction as long as the contacts 172 and 175 remain in engagement.

When the link 26 is shifted to the left in Figure 1 to a point bringing the chaser contact 173 into engagement with contact 175, the conditions are reversed, the field winding 165 being now directly energized from the inverter 168 while the field winding 164 is energized through the condenser 169. The motor will thus rotate in an opposite direction as long as contacts 173 and 175 are engaged. The energizing circuit for winding 165, with contacts 173 and 175 engaged, may be traced from the upper terminal of the inverter 168 through the conductor 176, contacts 175 and 173, conductor 171, winding 165 and terminal 167 to the lower terminal of the inverter. The circuit for winding 164 may be similarly traced from the upper terminal of the inverter through conductor 176, contacts 175 and 173, conductor 171, the condenser 169, winding 164, terminal 167, and back to the lower terminal of the inverter.

The operation of the motor 157, and its direction of rotation when operating, is thus seen to be controlled by the position of the link 26 and thereby is determined by the position to which the throttle 5 is adjusted.

*Operation*

Figure 2:
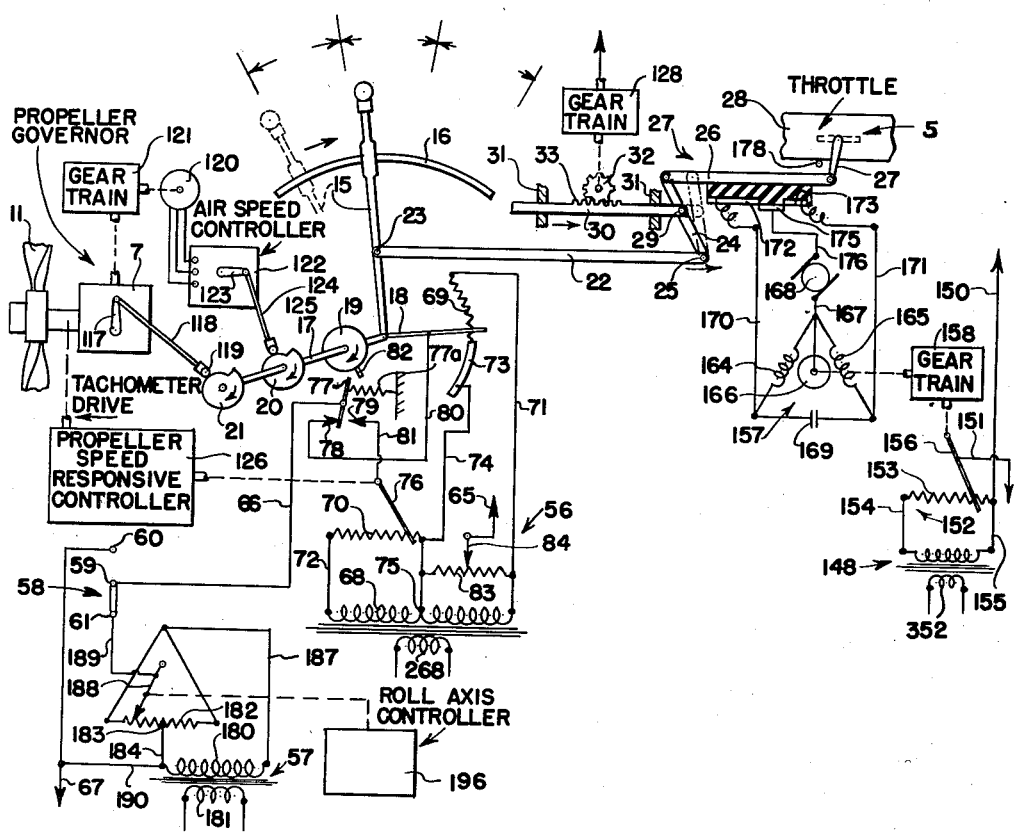
Figure 2 is a similar showing of certain parts of the system but under different conditions of operation.
Figure 3:
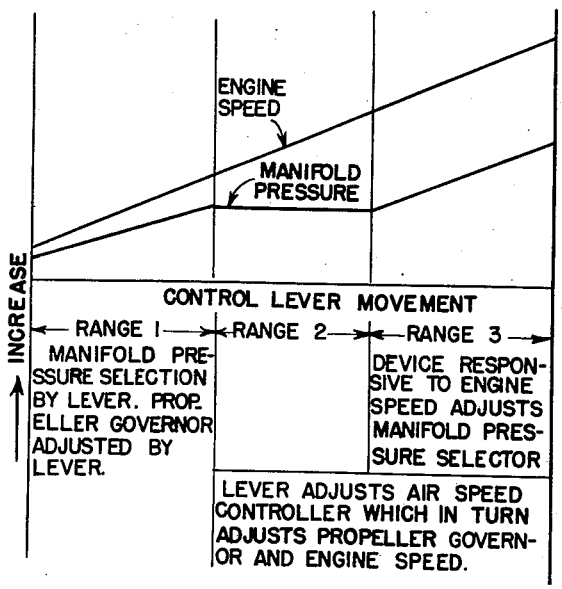
Figure 3 is a chart illustrating roughly the effect of engine speed and intake manifold pressure brought about by my control system and indicating the function of the single control member by which these factors are controlled.

In this description of the operation of my system as shown in Figure 1, reference will also be had to Figures 2 and 3.

It will first be understood that all of the primary windings 41, 181, 134, 268, 286, 298, 311, and 352 are connected to a common source of alternating current, or the various secondary windings are on a common transformer, so that the alternating potentials at the terminals of the secondary windings are in phase with each other. The signal potentials applied across the input terminals of the amplifiers 45 and 138 are, of course, the algebraic sums of the potentials developed in the associated series networks.

Considering first the operation of the compound network controlling the waste gate amplifier 45, it will be noted that I have indicated the polarities of the networks 53, 54, 55 and 56. Thus, the potential conditions existing during a half cycle when the polarities are as indicated will be described, for convenience, and for a reference potential the conductor 67, leading to amplifier input terminal 52 is shown as grounded at 147, or of zero potential.

With the control lever 15 in minimum power position, as seen in Figure 1, the slider 18 is at the positive end of the resistance 69. On the other hand, the slider 84 is at an intermediate point along the resistance 83 and so is at a negative potential with respect to the slider 18. Since slider 18, leads 80, 66, and 67 are all grounded it will be seen that network 56 under these conditions introduces a potential into the series circuit connecting the input terminals of the amplifiers such that the conductor 65 is negative with respect to grounded conductor 67.

Turning now to the network 55, it will be seen that, with the sliders 88 and 93 in the positions shown, this network introduces into the series circuit a potential determined by the potential of slider 88 relative to the potential of the left hand, positive terminal of the secondary winding 86. This potential is of a polarity such that the slider 93 is positive with respect to slider 88. The positive potential thus developed in network 55 opposes that produced in network 56 and the potential on conductor 64, with respect to grounded conductor 67 is the difference of the potentials developed in the two networks thus far discussed. It will be assumed that the voltage introduced by network 56 is equal to that introduced by network 55 so that conductor 64 is at ground potential.

Considering next the network 54, it will be evident that with the sliders 103 and 109 in the positions shown they are at substantially the same potential with respect to each other, being each directly in contact with the tap 102 on secondary winding 98. For purposes of this discussion the network 54 may be considered as developing no potential in the series circuit and the conductor 63 is therefore at the same potential as grounded conductor 67.

Turning last to the network 53 it will be evident that with the slider 115 in the position shown, the conductor 62 is negative with respect to slider 115 and the conductor 63. The magnitude of the negative potential thus introduced into the series circuit is determined by the position of the slider 115 along the resistance 112. Since conductor 63 is at ground potential, the conductor 62 is negative with respect to ground by the amount of the voltage introduced by network 53. Under such conditions the compound network is unbalanced and there is applied between the amplifier input terminals 51 and 52 a voltage such that terminal 51 is negative with respect to terminal 52.

The signal potential applied to the amplifier 45 under these conditions is of such polarity that the amplifier supplies energy to the waste gate motor winding 36 of such phase with respect to that supplied to winding 37 that the motor 34 attempts to drive the waste gate 6 towards open position. Since the waste gate 6 is already completely open, the motor simply exerts a torque against a limiting stop means (not shown).

Considering now the network conditions controlling the amplifier 138, it will first be understood that the input terminal 145 is grounded or at the same potential as conductor 67. Thus, conductor 64 is at the same potential as the grounded input terminal 145 assuming the balanced conditions in networks 56 and 55 are as discussed above. Tracing through networks 54 and 148, it is to be noted that rebalance slider 163 is at the extreme left hand end of resistor 160 so that no voltage exists between conductor 64 and slider 163. Hence, conductor 151 is likewise at ground potential. Referring now to the network 148, it is to be noted that slider 156 is in its extreme right hand position so that no voltage is introduced by network 148. Thus, conductor 150 leading to the input terminal 144 is at ground potential. Under these conditions, no voltage is supplied to the input terminal of the amplifier and the field winding 130 is deenergized. As a result, the motor 127 is deenergized.

For the present, the effect of the movement of the sliders 84, 93, 103 and 115 upon the amplifiers 45 and 138 will be ignored, particularly since these are essentially calibrating, or adjusting, and protective controls.

Assuming now that the engine is started up and the control lever 15 is advanced in range 1 of its movement, the slider 18 is moved away from the positive end of the resistance 69 having an immediate effect on the potential conditions in the series circuits as they are controlled by the network 56. Still considering the operation under conditions whereat the polarities and potentials are those heretofore described, the effect of this movement of the slider 18 is seen to be a decrease in the negative potential at conductor 65 with respect to conductor 67. This results in a reduction in the negative voltage between terminals 51 and 52. Since the unbalance voltage is still of such a phase as to cause the waste gate to run towards open position and since the waste gate is already fully open, no movement of the waste gate takes place.

The aforesaid movement of the control lever 15 also is translated mechanically to an opening movement of the throttle 5, it being evident that the endwise movement of the link 22 and resulting swinging movement of the link 24 about pivot 29 causes link 26 to shift to the left and open the throttle.

The rotation of the cam 21 by this movement of the control lever 15 also actuates the link 118 to adjust the propeller governor 7, causing the pitch of the blades of the propeller 11 to be changed in such manner as to bring about a progressive increase in engine speed. The air speed controller 122 is not, however, adjusted during this portion of the movement of the control lever 15 as has been previously pointed out. While the movement of slider 18 over potentiometer 69 tends to make the conductor 150 and terminal 144 positive with respect to terminal 145, this effect is largely overcome by the increase in manifold pressure resulting from the opening of the throttle 5. This increase causes slider 88 to move to the left with respect to resistor 87 and hence to make conductor 150 negative with respect to ground. At low altitudes, the change in the effect of network 56 due to movement of the slider 18 and that in network 55 due to the movement of slider 88 as a result of the increase in manifold pressure may exactly balance each other. At higher altitudes, however, the manifold pressure will not rise enough for the signal introduced by the increase in manifold pressure to balance out the signal introduced by movement of slider 18. Hence, conductor 150 and terminal 144 become positive with respect to terminal 145. The phase of the signal applied to the amplifier under these conditions is such that a current is supplied to winding 130 of such phase as to cause motor 127 to drive link 30 to the left. Since the pivot point 25 is stationary, this causes movement of the link 26 to the left to cause an opening movement of throttle 5. At the same time, the slider 163 is moved by motor 127 to the right to cause slider 163 to become negative with respect to conductor 101 and hence to introduce a rebalancing voltage tending to make conductor 150 less positive with respect to ground. The opening movement of the throttle will increase the manifold pressure even more, reducing the unbalance voltage. When the motor 127 has moved to a position at which the rebalancing voltage introduced by bridge 149 is equal to the reduced unbalance voltage, the potential of input terminal 144 of amplifier 138 will again be the same as that of grounded terminal 145 so that the motor 127 stops its rotation. Any tendency of the manifold pressure to increase, assuming all other things to remain the same, will cause a movement of slider 88 to the left to cause the input terminal 144 of amplifier 138 to become negative with respect to the grounded terminal 145. This causes an opposite effect to that considered, namely operation of motor 127 in a direction to close the throttle.

As the lever 15 is moved to the right through range 1, a point may be reached at which the throttle 5 becomes fully open, and further movement of lever 15 is temporarily prevented by a stop pin 178 engaging the throttle crank arm 27. The point at which lever 15 is stopped depends upon the position of throttle motor 127 which in turn is dependent upon the manifold pressure. When this happens, contact 175 engages chaser contact 173 to establish an energizing circuit to motor field windings 164 and 165, as previously traced. The direction of rotation under these conditions is such as to cause the motor 157 to move slider 156 to the left so as to cause conductor 150 to become negative with respect to conductor 151. This causes conductor 150 and terminal 144 to be negative with respect to terminal 145. It will be recalled that the effect of this type of unbalance is to cause the throttle motor to operate in such a direction as to close the throttle. As soon as the throttle starts moving towards closed position, however, the chaser contact 173 separates from contact 175 to interrupt the circuit previously traced. The movement of the throttle motor 127 causes slider 163 to be moved back towards the left to increase the potential of conductor 151 in a positive direction and hence to rebalance the series of networks connected to amplifier 138 thus stopping further movement of the throttle in closing direction. With the throttle slightly closed, it is possible to move the lever 15 still further to the right. This causes reengagement of contacts 173 and 175 and the process just described is repeated. Thus, upon continuous pressure being applied to lever 15, the chaser contacts 173 and 175 are continuously engaged with the throttle motor continually operating to shift the lever 24 to permit movement of lever 15 with the throttle in full open position. Thus, the effect of the throttle reset motor 157 is to permit a continued adjustment of lever 15 in throttle opening direction after the throttle has reached full open position. The reason for this is that the operation of the control system demands the movement of lever 15 throughout its entire range of movement despite the fact that under certain circumstances the throttle may be moved to full open position before the lever 15 has moved through range 1 of its movement. With this arrangement, the lever 15 is at all times mechanically connected to throttle 5 so that the throttle can at any time be manually moved to any desired position.

Whenever the pressure controller 97 is not satisfied by a movement of throttle 5 to a position approximating full open position, the waste gate motor 34 is placed into operation to start moving the waste gate towards closed position. It will be recalled that under the conditions previously described, the effect of bridges 53 and 56 in tending to make terminal 51 negative with respect to grounded terminal 52 was greater than the effect of bridge 55 in tending to make the terminal 51 positive with respect to terminal 52. As slider 18 is moved in a clockwise direction, however, the negative voltage introduced between conductors 65 and 80 decreases. This is overcome to some extent by the movement of slider 88 towards the left as higher manifold pressures are maintained. As slider 18 is moved in a clockwise direction, however, a position is soon reached where the effect of bridges 53 and 56 just balances the effect of bridge 55. Let it be assumed that either the slider 18 is moved further or that the intake manifold pressure drops so as to cause the movement of slider 88 towards the left. In either case, the effect is to cause conductor 62 and hence terminal 51 to become positive with respect to terminal 52 instead of negative as has been previously the case. When this happens, the signal supplied to amplifier 45 is of such phase as to cause energization of motor 34 in a direction to move the waste gate towards closed position. This is accompanied by a movement of slider 109 to the right so as to make slider 163 increasingly negative. The movement of waste gate 6 towards closed position continues until such time as the balancing effect resulting from the movement of rebalancing slider 109 to the right has been sufficient to overcome the unbalanced condition which initiated the movement of the motor.

The effect of moving waste gate 6 towards closed position is to result in exhaust gas being forced through the turbine 10 to initiate operation of the supercharger 12. Thus, the pressure of the air supplied to the intake manifold is increased to satisfy the demand of the pressure controller. Thereafter, the waste gate will be adjusted either towards open or towards closed position as is necessary to maintain the pressure at the selected value. Whenever a signal is supplied to the waste gate amplifier 45, a signal is also supplied to the throttle motor amplifier 138 since by reason of the arrangement including the throttle reset motor 157, the throttle motor amplifier network is kept constantly balanced. If the signal supplied to the two amplifiers is one calling for a higher manifold pressure, the throttle motor 127 will be operated in such a manner as to drive the throttle 5 towards open position. This will again bring contact 175 into engagement with contact 173, however, and cause energization of the throttle reset motor 157 to move the slider 156 to the left. This signal tends to counteract the signal applied to amplifier 138. The throttle reset motor 157 continues to operate and continues to move slider 156 to the left until the change in voltage across the terminals of network 148 is greater than the unbalance voltage which initiated operation of motor 127. When this happens, the throttle motor is operated in the opposite direction to move the contact 173 away from slider 175. Thus, despite the fact that the movement of the slider 15 or the movement of the pressure controller slider 88 in a direction to call for increased manifold pressure, causes operation of the throttle motor even after the throttle is in wide open position, no harm is done since the throttle reset motor merely operates to readjust the balance of the network until the throttle motor amplifier is no longer energized.

It is often desirable to start closing the waste gate some time before the throttle is fully open. In other words, it is desirable to have an overlap between the throttle and waste gate operations. The overlap controller 116 is provided for this purpose. As slider 115 is moved downwardly, the balance point of the series of networks controlling the energization of amplifier 45 is changed in such a manner as to cause waste gate 6 to be closed at a higher manifold pressure or at a less advanced position of slider 18 than would otherwise be the case. It will be noted that the bridge 53 including the overlap controller 116 does not affect the energization of the throttle motor amplifier 138. Thus, movement of slider 115 causes the closing of waste gate 6 to take place earlier in the sequence than would otherwise be the case without affecting the operation of the throttle controls. This results in an increase in the amount of overlap between the throttle and waste gate operations.

The calibrating potentiometer 85 is provided for the purpose of adjusting the manifold pressure. It will be clear that the movement of the slider 84 to the right increases the manifold pressure that is maintained for any given setting of the slider 18. Similarly, a movement of the slider 84 to the left effects a decrease in the value of the manifold pressure that is maintained by the system for any given setting of the slider 18.

The purpose of the acceleration controller is to cause the waste gate 6 to be moved towards open position whenever the acceleration of the turbine becomes excessive. Upon the acceleration exceeding a predetermined value, slider 96 is moved to the right. This tends to cause conductor 64 and hence terminal 51 to become more negative with respect to grounded terminal 52. It will be recalled that the effect of making terminal 51 negative with respect to terminal 52 is to cause the waste gate to be moved towards open position. Similarly, if the velocity at any time becomes excessive, the slider 103 is moved toward the right. This in turn has a similar effect causing terminal 51 to be made more negative with respect to terminal 52. The operation of the calibrated potentiometer 85, the acceleration controller and the velocity controller is more fully described in my co-pending application Serial No. 476,797 filed February 22, 1943, now Patent No. 2,477,668.

The operation which has been described so far is that which can take place while the operating lever 15 is in range 1. Summarizing, during this range of movement of lever 15, the setting of the propeller governor is constantly increased to increase the speed of the propeller. Similarly, the setting of the manifold pressure controls are increased to maintain a continually increased manifold pressure. The manifold pressure and propeller speed for any given setting of the lever 15 is maintained at values dependent upon the position of the lever. When the demand for manifold pressure is relatively low, this is taken care of by an opening movement of throttle 5. As the need for manifold pressure increases, however, the waste gate 6 is moved towards closed position to bring the compressor 12 into operation to an increasing extent. During this first range of movement, the air speed controller has not been adjusted so that it remains inactive.

Upon control lever 15 entering range 2, the engine speed is adjusted in accordance with air speed, as selected by the air speed controller 122. The direct control over the propeller governor 7 by the control lever 15 ceases as the lever reaches range 2 of its movement, as has been pointed out, but the air speed controller 122 is then advanced by cam 20 and link 124 to select a suitable air speed for cruising and like operations. In turn the controller 122, through motor 120 and gear train 121, positions the propeller governor 7 to select an engine speed known to be best adapted to that air speed. These are factors determined by the particular engine and aircraft and the cam 20 is properly selected and formed in order to bring about the adjustment in a precise and predetermined manner.

The movement of the control lever 15 through the range 2 has no effect over the controlled intake manifold pressure since the slider 18 is then moving across the conductive dead spot 73 of potentiometer 69. Thus the balance conditions in the network controlling amplifier 45 are not affected by the movement of the lever and the waste gate 6 is controlled by the pressure controller 97 to maintain a constant manifold pressure. As the lever is advanced through range 2, the waste gate will be moved toward the open position because the increased R. P. M. will result in a greater boost from the engine driven blower.

As the control lever 15 now enters and advances through range 3 of its adjustment, the throttle resetting action continues as has been described, and the air speed controller 122 is advanced to increase engine speed further by its control over the propeller governor 7. At this point, however, manual selection of the intake manifold pressure ceases as the changeover switch arm 77 is engaged by the finger 82 on disk 19 and swung into engagement with fixed contact 79. The circuit to the slider 18 is thus broken, and instead conductor 67 (and 66) is connected to the slider 76. Since slider 18 is at the potential of the left terminal of resistor 70 when this happens and since slider 76 is at the right end of resistor 70, no abrupt change in the manifold pressure occurs. As previously explained, the slider 76 is positioned by the controller 126 responsive to propeller or engine speed, and as the speed increases above a predetermined value, in response to the advance of the control lever 15, controller 126 moves slider 76 from the right hand end of resistance 70 along the resistance at a rate preselected to properly increase the intake manifold pressure along an optimum operating curve. The adjustment of slider 76, of course, selects and adjusts the pressure by unbalancing the networks controlling amplifiers 45 and 138 in such a manner as to operate either motor 34 or motor 127 to position either the waste gate 6 or the throttle as required.

In summation, it will be evident that advancing the single control lever 15 will result in an increase in engine speed and power at a certain rate and proportion predetermined and selected in accordance with known operating characteristics.

Basically, the control lever first increases intake manifold pressure and engine speed along a preselected desirable curve, following the known optimum line and then positions or sets an air speed controller which in turn instigates the selection of engine power and speed to maintain the selected air speed regardless of altitude and other varying factors. All this is accomplished without requiring precise adjustments of several controls by the pilot, with the attendant possibility that optimum operating conditions would not always be maintained.

The effect of the movement of the control lever on engine speed and power is indicated in the chart of Figure 3 and the controls and adjustments responsive to the lever, as it moves through its three ranges, are set out with reference to the corresponding changes in engine speed and power. The engine speed and pressure curves as here shown are, of course, only approximate and in practice they will closely follow the optimum power curves as determined by propeller load curves, fuel economy, detonation limits, and other considerations.

The return movement of the control lever 15 toward starting position will, of course, reverse the actions just described and will reduce both engine speed and intake manifold pressure. It will be understood that a resetting action of the throttle will occur during this movement, the chaser contact 172 engaging contact 175 to close the circuit between the inverter 168 and field winding 164 of the motor 157 in order to shift the slider 156 to the left and supply the amplifier 138 with a signal potential such as to run the floating link 30 back toward the left until the slider 156 finally reaches the right end of resistor 153.

As is well known in the art there is a pronounced tendency for the air speed of an aircraft to fall off as it makes a turn. Inasmuch as, during the latter portions of the advance movement of control lever 15, the selection of intake manifold pressure and engine speed are instigated by the controller 122 responsive to air speed, it is desirable that any factors materially affecting air speed be overcome.

It is the function of the network 57 to overcome this undesirable effect and compensate the system thereagainst. To this end, the network 57 comprises a transformer having a secondary winding 180 and a primary winding 181, and the latter is connected to the same source of energy as all the primaries of the other networks. A slidewire resistance 182 is provided and a center tap 183 thereon is connected to one terminal of the secondary winding 180 by a conductor 184. The ends of the resistance 182 are connected to each other by conductors 185 and 186 and are further connected by a conductor 187 to the other end terminal of secondary winding 180. A slider 188 cooperates with the resistance 182 and is connected by a conductor 189 to the lower terminal 61 of the switch 58. The slider 188 is associated with a vertical gyroscope 196 (shown schematically) and is positioned with respect to resistance 182 in response to banking of the plane.

The slider 188 is operatively arranged to normally stand at the center of the resistance 182 (Figure 1) but is positioned by gyroscope 196 to move therealong away from such position in opposite directions in response to banking movement of the plane, or movements thereof about a longitudinal roll axis. This section is illustrated in Figure 2, and since such control operation, per se, is known it will not further be described herein.

Assuming now that the switch arm of switch 58 is manually operated to close the circuit between its terminals 59 and 61, it will be evident that the network 57 is then included in circuit between the network 56 and the conductor 67 leading to amplifier input terminals 52 and 145. The circuit may be traced, from the conductor 66, making connection to network 56, through terminals 59 and 61 of the switch 58, conductor 189, the slider 188, center tap 183 of the resistance 182, conductor 184 and a conductor 190 which connects the left hand end terminal of the transformer to conductor 67. Under normal conditions, it will be seen then that the network 57 has no effect in the series circuit, since none of the resistance 182 is in circuit and direct connection is made between the slider 188 and the center tap 183.

However, as the plane banks or rolls, as it will on starting to turn to either side, the slider 188 will, as stated, swing in one direction or another placing a part of the resistance 182 in circuit, the amount depending on the magnitude of the movement of the plane about its roll axis. Assuming the potential conditions which exist during a half cycle at which the ends of the secondary winding 180 are of the polarity indicated, such movement of the slider 188, in either direction, will result in the slider 188 becoming positive with respect to conductor 190. The network 57 under these conditions is thus seen to introduce a potential into the series circuit such that the amplifiers 45 and 138 are provided with signals tending to cause them to operate in such a manner as to increase the manifold pressure. If the throttle is entirely open, the effect of this will be to cause the motor 34 to move the waste gate towards closed position, from whatever position it may have been previously. If the throttle is not fully open, the effect will be to cause the throttle to move towards open position. In either event, the result is a boost in intake manifold pressure and engine power calculated to overcome the tendency toward the reduction in air speed as the aircraft turns. When the turn is completed, the slider 188 returns to normal position, this manifold pressure increasing signal potential is removed, and the selected engine power condition is restored.

The switch 58 may be manually operated by the pilot or flight engineer to connect the network 57 into the overall control system whenever optimum flight characteristics are desired. It will be seen that with the network 57 switched into the power control circuit, when the craft goes into a turn, the roll axis controller 196 will anticipate the effects of the turn and increase the manifold pressure, and therefore the power, before the airspeed has changed. This anticipation correction will be present no matter in what range the power lever 15 may be adjusted.

Conclusion

It will be apparent that in multi-engine installations of my control system, wherein a separate control lever 15 is provided for each engine, the speeds of the individual engines may be accurately synchronized, during the time the levers are in range 2 of their movement, by minor adjustments and without affecting intake manifold pressures, optimum cruising conditions and trim may thus be readily attained. It will further be apparent that the control apparatus will modify the engine operating pressure when the engine diverts from a preselected attitude.

I claim as my invention:

1. Intake pressure control apparatus for a combustion engine, comprising, pressure responsive means, motor means arranged to variably adjust the intake pressure of the engine, pressure selecting means, means connecting said responsive means and said selecting means in controlling relation to said motor means so that the selected pressure may be maintained, controlling means responsive to the departure of the craft from a predetermined attitude, and means connecting said controlling means to said motor means to modify the affect of said pressure selecting means whenever the craft departs from said predetermined attitude.

2. Apparatus for controlling an aircraft combustion engine which drives an air moving device, comprising, a first controller responsive to the speed of said air moving device, a second controller responsive to the deviation of said craft from a predetermined attitude, a motor means arranged for regulating the power output of the engine, and means connecting said first and second controllers to said motor means to control the operation of the same.

3. In an aircraft engine power control apparatus, the combination comprising, airspeed responsive means for adjusting the engine power control apparatus to maintain a selected aircraft speed, and means responsive to movement of said aircraft engine about its roll axis connected to the power control apparatus for increasing power when there is a roll deviation from a normal position.

4. In an aircraft engine power control apparatus, the combination comprising, balanceable electrical network control means for maintaining a selected manifold pressure, and aircraft attitude responsive means connected to such control means to vary the balance of said means in an increased manifold pressure direction when said attitude responsive means indicates a deviation from a predetermined normal position.

5. In a control apparatus for an aircraft engine having a turbo-supercharger, the combination comprising, a controller adapted for regulating the effect of the turbo-supercharger on engine intake pressure, airspeed responsive means, means operably connecting said airspeed responsive means in controlling relation to said controller, and roll responsive means connected to said controller to increase the effect of the turbo-supercharger when a roll condition exists.

6. Control apparatus for use with an aircraft combustion engine having a propeller pitch control device and a manifold to which air is controlled by a throttle, comprising, a manually operated control lever, manifold pressure responsive means, engine speed sensing means, motor means for controlling said throttle, connection means including said pressure responsive means and said engine speed sensing means for connecting said lever in controlling relation to said motor means, air speed controlling means, connection means including said air speed controlling means for connecting said lever in controlling relation to said propeller pitch control device, attitude responsive means, and means operatively connecting said attitude responsive means to said motor means so that variations of the attitude of the aircraft are effective on the operation of the combustion engine.

7. Control apparatus for use with a combustion engine having variable loading and an intake chamber to which air is controlled by a flow control device, comprising, a control lever, intake chamber pressure responsive means, engine speed sensing means, actuating means for controlling said flow control device, connection means including said pressure responsive means and said speed sensing means for connecting said control lever in controlling relation to said actuating means, speed controlling means, connection means including said speed controlling means for connecting said lever in controlling relation to said variable loading means, attitude responsive means, and means operatively connecting said attitude responsive means to said motor means so that variations of the attitude of the combustion engine are effective on its operation.

References Cited in the file of this patent

UNITED STATES PATENTS

| Number | Name | Date |
|---|---|---|
| 1,801,948 | Boykow | Apr. 21, 1931 |
| 2,112,965 | Köster | Apr. 5, 1938 |
| 2,191,250 | Fischel | Feb. 20, 1940 |
| 2,233,307 | Dodson | Feb. 25, 1941 |
| 2,423,336 | Moseley | July 1, 1947 |
| 2,432,166 | Mallory | Dec. 9, 1947 |
| 2,445,389 | Chandler | July 20, 1948 |
| 2,471,821 | Kutzler | May 31, 1949 |
| 2,496,294 | Kellogg | Feb. 7, 1950 |